(No Model.)
V. ANDERSON.
DEVICE FOR TEACHING NUMBERS TO CHILDREN.
No. 431,102. Patented July 1, 1890.
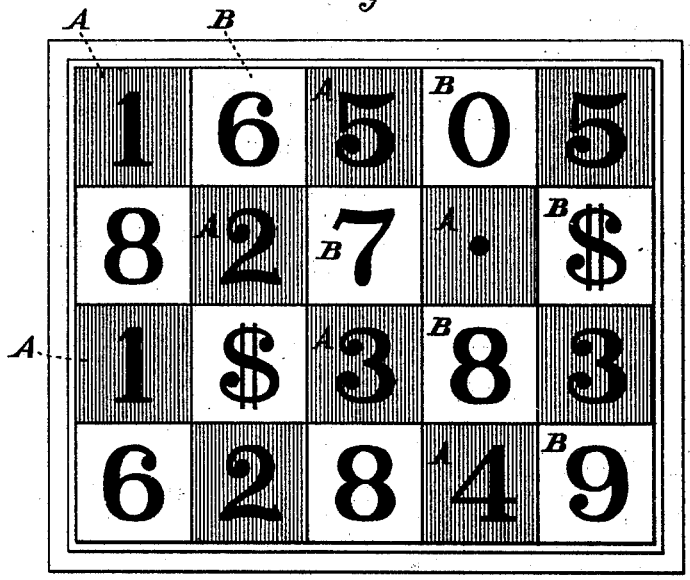
Fig. 2.
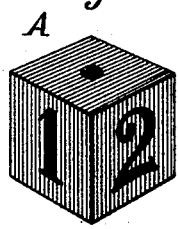
Fig. 4.
Fig. 3.
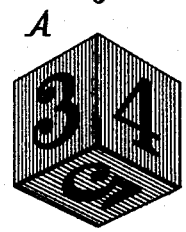
Fig. 5.
WITNESSES:
Philip C. Massi.
C. S. Taylor
INVENTOR
Villette Anderson
BY
E. W. Anderson
her ATTORNEY

UNITED STATES PATENT OFFICE.

VILLETTE ANDERSON, OF WASHINGTON, DISTRICT OF COLUMBIA.

DEVICE FOR TEACHING NUMBERS TO CHILDREN.

SPECIFICATION forming part of Letters Patent No. 431,102, dated July 1, 1890.

Application filed August 17, 1889. Serial No. 321,057. (No model.)

*To all whom it may concern:*

Be it known that I, VILLETTE ANDERSON, a citizen of the United States, and a resident of Washington, in the District of Columbia, have invented certain new and useful Improvements in Devices for Teaching Numbers to Children; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 of the drawings is a representation of a plan view of a set of my cubes. Fig. 2 is a perspective view showing three sides of one block and the devices thereon. Fig. 3 is a perspective view showing the other three sides of the same block. Fig. 4 is a perspective view showing three sides of the other block, and Fig. 5 is a similar view showing the other three sides thereof.

The object of the invention is to provide simple and attractive devices whereby a young child may learn to distinguish figures and to understand their meaning and use; and the invention also involves special reference to cash values, it being designed to interest the young intelligence through its adaptation to the representation of such small amounts as may come into his posession, while larger amounts may be readily set out as the knowledge of the child increases.

In the accompanying drawings I have represented a set of cubical blocks, which may be of any number readily contained in a box, but reducible, however, to two—that is to say, the blocks A and B these two blocks constituting the primary pair, and being preferably distinguished from each other, as, for instance, by their being of different colors. The block A is designed to have upon five of its faces five of the nine digits, these being disposed singly, or one digit upon each face, as shown. Upon the sixth face of this block is the value-mark—as, for instance, the decimal point, which distinguishes cents. This block may be colored differently from the block B, so that the two can be distinguished at a glance. The block B has upon five of its faces the other four digits and the cipher singly disposed, and upon its sixth face the value-mark, as, for instance, the dollar sign; or other value-marks may be employed, as, for instance, "Feet" and "Inches," "Francs" and "Centimes," &c.

Usually I prefer to arrange the first five digits on the block A and the other four digits and the cipher on the block B, and I prefer to have the digits arranged to follow each other around the block, so that they can be readily found in their position by turning the block in the fingers; but the digits, cipher, and the value-marks may be otherwise disposed upon the twelve faces of the two blocks without departing from my invention. Six or eight pairs of such blocks may be inclosed in a box or case, and will provide much instruction in an agreeable form for young children, leading them to become familiar with the forms and names of the figures and value-marks, and enabling them to perform small computations, and in after years the benefit of such early acquaintance or familiarization with figures and their uses will have no unimportant bearing upon their more advanced mathematical education.

I am aware that it is not new to provide figures in a desultory manner upon blocks, and I do not broadly claim such invention.

What I claim, and desire to secure by Letters Patent, is—

1. A pair of cubical blocks having thereon the nine digits, the cipher, and the value-marks singly disposed on the faces of said blocks, substantially as specified.

2. A pair of distinguishable-cubical blocks consisting of the block A, having five digits and a value-mark singly disposed upon its faces, and the block B, having the four other digits, the cipher, and a value-mark likewise singly disposed upon its faces, substantially as specified.

3. A pair of cubical blocks distinguishable from each other by their color and having the digits and cipher singly disposed upon their faces, substantially as specified.

4. A set or series of pairs of distinguishable cubical blocks, each pair having the nine digits, the cipher, and the value-marks singly disposed upon the faces of said pair, substantially as specified.

In testimony whereof I affix my signature in presence of two witnesses.

VILLETTE ANDERSON.

Witnesses:
MARY BOYKIN,
J. W. ANDERSON.